(12) United States Patent
Vestergaard Kragelund et al.

(10) Patent No.: US 10,367,439 B2
(45) Date of Patent: Jul. 30, 2019

(54) PUMP ASSEMBLY AND CONTROLLING METHOD

(71) Applicant: GRUNDFOS HOLDING A/S, Bjerringbro (DK)

(72) Inventors: Klaus Vestergaard Kragelund, Risskov (DK); Jan Plougmann, Bjerringbro (DK); Jan Carøe Aarestrup, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 15/938,420

(22) Filed: Mar. 28, 2018

(65) Prior Publication Data

US 2018/0287539 A1    Oct. 4, 2018

(30) Foreign Application Priority Data

Mar. 31, 2017   (EP) .................................... 17164402

(51) Int. Cl.
| | |
|---|---|
| F04B 17/03 | (2006.01) |
| H02P 23/00 | (2016.01) |
| H02P 25/024 | (2016.01) |
| H02P 25/16 | (2006.01) |
| H02P 27/08 | (2006.01) |
| F04D 15/00 | (2006.01) |
| F04D 13/06 | (2006.01) |

(Continued)

(52) U.S. Cl.
CPC ............ *H02P 23/009* (2013.01); *F04D 13/06* (2013.01); *F04D 15/0066* (2013.01); *H02P 21/0089* (2013.01); *H02P 25/024* (2016.02);

*H02P 25/16* (2013.01); *H02P 27/085* (2013.01); *H02P 29/40* (2016.02); *F04D 15/0088* (2013.01); *H02P 2201/03* (2013.01); *H02P 2207/05* (2013.01)

(58) Field of Classification Search
USPC .......................... 417/423.15, 424.1; 415/229
See application file for complete search history.

(56) References Cited

U.S. PATENT DOCUMENTS

| | | | |
|---|---|---|---|
| 6,407,531 B1 | 6/2002 | Walters et al. | |
| 8,690,549 B2 * | 4/2014 | Aarestrup | F04D 13/06 318/432 |

(Continued)

FOREIGN PATENT DOCUMENTS

EP    2 133 991 A1    12/2009

*Primary Examiner* — Bentsu Ro
(74) *Attorney, Agent, or Firm* — McGlew and Tuttle, P.C.

(57) ABSTRACT

A pump assembly (1) includes a pump unit (2) capable of providing a desired head ($H_0$) at zero flow rate, a brushless speed-controlled permanent-magnet AC drive motor (205) for driving the pump unit (2), and a control unit for controlling the drive motor (205). The control unit includes a frequency converter configured to receive an input voltage ($U_{in}$). The drive motor (205) is operable in a field-weakening mode and non-field-weakening mode. The drive motor (205) is undersized for driving the pump unit (2) at a design input voltage ($U_0$) to provide a lower head (H) than the desired head ($H_0$) at zero flow rate in the non-field-weakening mode and for driving the pump unit (2) to provide the desired head ($H_0$) at zero flow rate in the field-weakening mode.

23 Claims, 6 Drawing Sheets

(51) Int. Cl.
*H02P 29/40* (2016.01)
*H02P 21/00* (2016.01)

(56) References Cited

U.S. PATENT DOCUMENTS

2005/0068001 A1   3/2005   Skaug et al.
2013/0216407 A1   8/2013   Rasmussen et al.
2013/0289781 A1   10/2013  Kallesøe et al.

* cited by examiner

PUMP ASSEMBLY AND CONTROLLING METHOD

CROSS REFERENCE TO RELATED APPLICATIONS

This application claims the benefit of priority under 35 U.S.C. § 119 of European Application 17164402, filed Mar. 31, 2017, the entire contents of which are incorporated herein by reference.

BACKGROUND

A pump and, in particular, the armature of the stator of the electrical drive motor of such pumps are usually designed for providing a certain head $H_0$ at zero flow rate with maximum efficiency. Normally, the maximum efficiency is reached by a design that allows providing the required head $H_0$ at zero flow rate in a non-filed weakening mode at a maximum modulation index close to 1.

EP 2 133 991 describes a speed controlled pump which makes use of field weakening to optimise electrical power consumption at low flow rates.

SUMMARY

In contrast to such known pumps, embodiments of the present disclosure provide a pump assembly with a further optimized design that is more efficient for certain load cases.

In accordance with a first aspect of the present disclosure, a pump assembly is provided comprising a pump unit capable of providing a desired head $H_0$ at zero flow rate, a brushless speed-controlled permanent-magnet AC drive motor for driving the pump unit, and a control unit for controlling the drive motor, wherein the control unit comprises a frequency converter configured to receive an input voltage $U_{in}$. The drive motor is operable in a field-weakening mode and non-field-weakening mode, wherein the drive motor is undersized for driving the pump unit at a design input voltage $U_0$ to provide a lower head H than the desired head $H_0$ at zero flow rate in the non-field-weakening mode and for driving the pump unit to provide the desired head $H_0$ at zero flow rate in the field-weakening mode. "Undersized" shall mean herein that a chosen design parameter of the drive motor, in particular of the armature of the stator, such as the number of stator windings and/or the wire cross-section of the stator windings, would result in a head H at zero flow rate in the non-field-weakening mode, wherein the head H is lower than $H_0$. This means that the head $H_0$ is only achievable with the undersized drive motor in the field-weakening mode. However, as running in field-weakening mode is in generally less efficient, this is not a preferred operating mode of the pump disclosed herein. The undersized motor can be operated more efficiently at a higher output voltage and a lower phase current than a standard design during part load of the motor.

When the frequency converter receives a fixed input voltage, the design input voltage $U_0$ may be chosen to be the lowest possible DC input voltage $U_{in}$ for providing the head H at zero flow rate in the non-field-weakening mode.

The pump disclosed herein is preferably operated over the most of the usage time in the non-field-weakening mode and optionally at a modulation index M that is below a maximum modulation index $M_{max} \approx 1$. The modulation index M shall be defined herein as the ratio between the effective AC output voltage $U_{out}$, i.e. the output phase voltage relative to a neutral potential, of the frequency converter and the maximum effective AC output voltage $U_{out,max}$, which is limited by the frequency converter input DC voltage $U_{in}$, i.e.

$$M = \frac{U_{out}}{U_{out,max}} = \frac{U_{out}}{\frac{U_{in}}{2 \cdot \sqrt{2}} \cdot 1.15}.$$

In other words, the frequency converter is mostly operated at part load rather than full load. At full load, the motor efficiency of the pump disclosed herein is lower than for a usual motor design, but it is higher at part load as will be explained in more detail below. So, a usual motor design is optimized to a full load operation, whereas the pump disclosed herein is optimized to a part load operation while still allowing achieving the required $H_0$ at a zero flow rate in the field weakening mode when needed. Herein, full load means that the frequency converter is fed with the maximum input power, whereas part load means that the frequency converter is fed with less than the maximum input power.

Optionally, the frequency converter may be configured to provide a pulse width modulated AC output voltage $U_{out}$ at a modulation index M to the drive motor. The modulation index M may be below the maximum modulation index $M_{max} \approx 1$ in part load operation. Optionally, the AC output voltage $U_{out}$ may be limited by the input voltage $U_{in}$ at a maximum modulation index $M_{max} \approx 1$, for instance $$U_{out,max} = \frac{U_{in}}{2 \cdot \sqrt{2}} \cdot 1.15.$$

Optionally, the control unit may further comprise a voltage converter for providing the input voltage $U_{in}$ to the frequency converter, wherein the input voltage $U_{in}$ is adjustable within a voltage range between a minimum input voltage $U_{in,min}$ and a maximum input voltage $U_{in,max}$. Thereby, switching losses within the frequency converter can be reduced when it is run at a modulation index M closer to the maximum modulation index $M_{max} \approx 1$ in part load operation, because $U_{out,max}$ may be reduced with the input voltage $U_{in}$. So, for different load cases the input voltage $U_{in}$ may be tuned to maintain the highest possible modulation index M for reducing switching losses in the frequency converter as much as possible.

Optionally, the drive motor may comprise a stator with at least 10% more windings of a wire having at least a 10% smaller cross-section compared to a reference drive motor sized for driving the pump unit to provide the desired head $H_0$ at zero flow rate in the non-field-weakening mode. The reference drive motor may be defined as the drive motor having a number of stator windings and a wire cross-section of the stator windings that would result in the desired head $H_0$ at zero flow rate in the non-field-weakening mode, preferably at a modulation index M at or close to the maximum modulation index $M_{max} \approx 1$ in full load operation. Any other parameters may be identical between the reference drive motor and the undersized drive motor disclosed herein.

Optionally, the undersized motor, in particular the undersized stator (sometimes referred to as armature), may demand an at least 10% higher output voltage $U_{out}$ from the frequency converter when operated in non-field-weakening mode compared to a reference drive motor sized for driving the pump unit to provide the desired head $H_0$ at zero flow rate in the non-field-weakening mode. The reference drive motor may be defined here as having a stator or armature design that drives the pump unit at a design input voltage $U_0$ to provide the desired head $H_0$ at zero flow rate in the non-field-weakening mode.

Optionally, the frequency converter is configured to receive an input voltage $U_{in}$ below 60 V. Thereby, the electronic components for the motor electronics can be more cost-efficient.

Optionally, the voltage converter may be configured to provide the input voltage $U_{in}$ within a voltage range between the minimum input voltage $U_{in,min}$ and a reference voltage $U_{ref}$ in the field-weakening mode, and wherein the voltage converter is configured to provide the input voltage $U_{in}$ within a voltage range between the reference voltage $U_{ref}$ and the maximum input voltage $U_{in,max}$ in the non-field-weakening mode, wherein $U_{in,min} < U_{ref} < U_{in,max}$. The reference voltage $U_{ref}$ may be defined herein as the input voltage $U_{in}$ in non-field-weakening mode for which the modulation index M is maximal, i.e.

$$M_{max} = \frac{U_{out}}{\frac{U_{ref}}{2 \cdot \sqrt{2}} \cdot 1.15} \approx 1.$$

Thus, for reducing the input voltage $U_{in}$ below the reference voltage $U_{ref}$ the motor may be operated in field-weakening mode. When selectively operated in field-weakening mode or non-field-weakening mode, a combined system of frequency converter, motor and voltage converter may have a minimum power loss at a lower input voltage $U_{in}$ than the reference voltage $U_{ref}$. In part load, in order to provide such a preferred input voltage $U_{in}$ resulting in a minimum power loss it may be advantageous to operate the undersized motor in field-weakening mode.

Optionally, the frequency converter may be configured to operate at a maximum modulation index $M_{max} \approx 1$ when the input voltage $U_{in}$ approximately equals the reference voltage $U_{ref}$. This is preferred for full load cases in non-field-weakening mode.

Optionally, in case of an adjustable input voltage, the design input voltage $U_0$ may be the maximum input voltage $U_{in,max}$ for providing the head H at zero flow rate in the non-field-weakening mode.

Optionally, the control unit may be configured to determine an actual power consumption of at least one of the drive motor and the frequency converter during operation of the pump unit, and wherein the control unit is configured to tune the input voltage $U_{in}$ so that the determined actual power consumption is minimised. Optionally, the pump unit comprises a wet rotor circulation pump for a heating or cooling system.

In accordance with a second aspect of the present disclosure, a method is provided for controlling a brushless speed-controlled permanent-magnet AC drive motor via a frequency converter for driving a pump unit for providing a desired head $H_0$ at zero flow rate, the method comprising:
driving the pump unit at a design input voltage $U_0$ to provide a lower head H than the desired head $H_0$ at zero flow rate in a non-field-weakening mode,
driving the pump unit to provide the desired head $H_0$ at zero flow rate in a field-weakening mode.

Optionally, the design input voltage $U_0$ may be the lowest possible input voltage $U_{in}$ for providing the head H at zero flow rate in the non-field-weakening mode. Optionally, driving the pump unit at a design input voltage ($U_0$) to provide a lower head H than the desired head $H_0$ at zero flow rate in a non-field-weakening mode may comprise driving the pump unit with an at least 10% higher output voltage $U_{out}$ from the frequency converter to the drive motor compared to driving the pump unit with a reference drive motor sized for driving the pump unit to provide the desired head $H_0$ at zero flow rate in the non-field-weakening mode.

Optionally, the method may further comprise a step of providing a pulse width modulated AC output voltage $U_{out}$ at a modulation index M to the drive motor.

Optionally, the method may further comprise providing an input voltage $U_{in}$ to the frequency converter, wherein the input voltage $U_{in}$ is adjustable within a voltage range between a minimum input voltage $U_{in,min}$ and a maximum input voltage $U_{in,max}$.

Optionally, in case of an adjustable input voltage $U_{in}$, the design input voltage $U_0$ may be the maximum input voltage $U_{in,max}$ for providing the head H at zero flow rate in the non-field-weakening mode.

Optionally, the step of providing an input voltage $U_{in}$ may comprise providing an input voltage $U_{in}$ below 60 V.

Optionally, providing the input voltage $U_{in}$ may comprise providing the input voltage $U_{in}$ within a voltage range between the minimum input voltage $U_{in,min}$ and a reference voltage $U_{ref}$ in the field-weakening mode, and wherein providing the input voltage $U_{in}$ includes providing the input voltage $U_{in}$ within a voltage range between the reference voltage $U_{ref}$ and the maximum input voltage $U_{in,max}$ in the non-field-weakening mode, wherein $U_{in,min} < U_{ref} < U_{in,max}$.

Optionally, the method may comprise operating the frequency converter at a maximum modulation index $M_{max} \approx 1$ when the input voltage $U_{in}$ approximately equals the reference voltage $U_{ref}$.

Optionally, the method may further comprise determining an actual power consumption of at least one of the drive motor and the frequency converter during operation of the pump unit, wherein the control unit is configured to tune the input voltage $U_{in}$ so that the determined actual power consumption is minimised.

SUMMARY OF THE DRAWINGS

Embodiments of the present disclosure will now be described by way of example with reference to the following figures of which.

DETAILED DESCRIPTION

Figure 1:
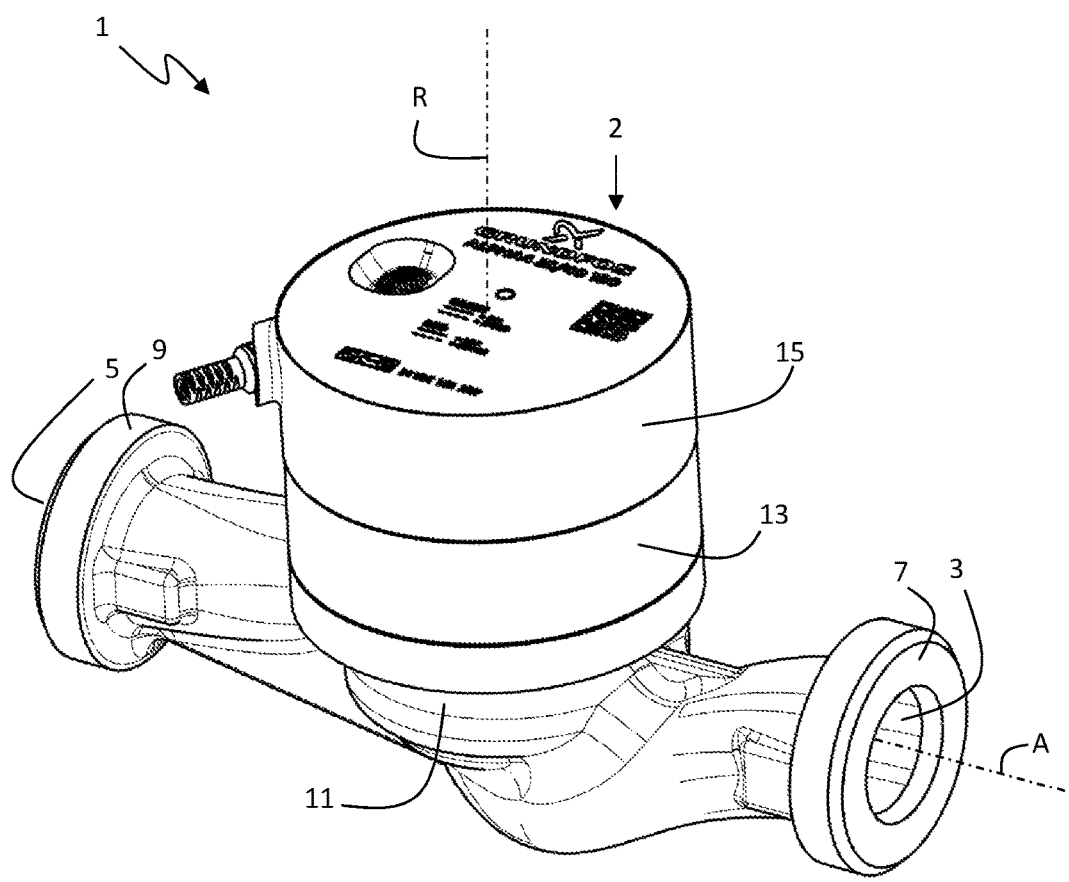
FIG. 1 is a perspective view on an example of a pump assembly disclosed herein.

Referring to the drawings, FIG. 1 shows a pump assembly 1 with a centrifugal pump unit 2, an input port 3 and an output port 5, wherein the input port 3 and an output port 5 are coaxially arranged on a pipe axis A on opposing sides of the pump unit 2. The input port 3 and the output port 5 comprise connector flanges 7, 9 for a connection to pipes (not shown). The pump unit 2 comprises a rotor axis R essentially perpendicular to the pipe axis A. A pump housing 11 of the pump unit 2 is essentially arranged between the input port 3 and the output port 5. The pump housing 11 comprises an impeller (not shown) for rotating around the rotor axis R and pumping fluid from the input port 3 to the output port 5. The impeller is driven by a motor (not shown) located in a motor housing 13 extending from the pump housing 11 along the rotor axis R to an electronics housing 15. The electronics housing 15 comprises an inverter circuit 201 (see FIG. 2) for controlling a three-phase synchronous permanent magnet drive motor 205.

Figure 2:
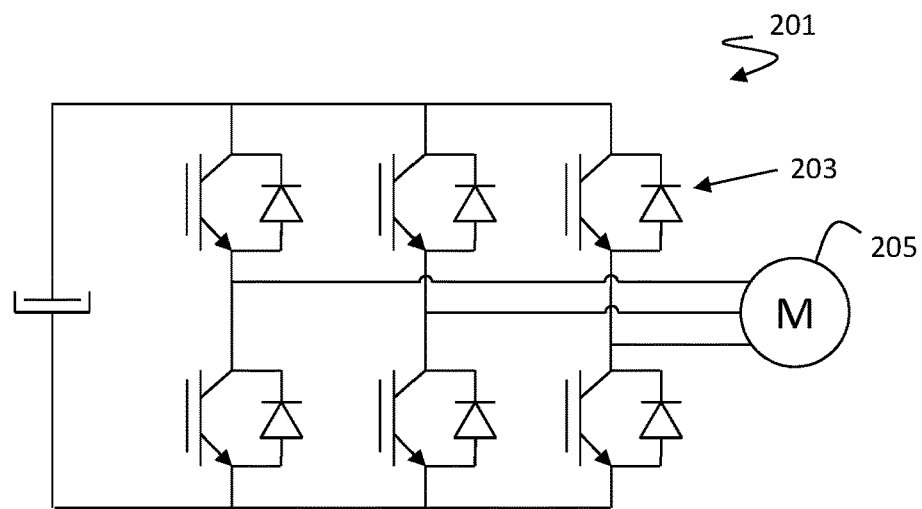
FIG. 2 is a schematic power circuit diagram of a control unit according to an example of a pump assembly disclosed herein.

The circuit diagram of FIG. 2 illustrates the basic principle of the inverter circuit 201 of a frequency converter of a motor control unit located within the electronics housing 15, the inverter circuit 201 comprising six switches 203 in form of insulated-gate bipolar transistors (IGBT) or metal oxide semiconductor field effect transistors (MOSFET). A microcontroller (not shown) controls the six switches 203 to produce a desired pulse width modulated AC output voltage $U_{out}$ for each phase of the three-phase motor 205. The three phases are phase-shifted by 120° relative to each other for driving the motor 205. An input voltage $U_{in}$, which may be referred to as DC link voltage, may be provided as input to the converter 201 by a rectifier (not shown) or a voltage converter (not shown). The input voltage $U_{in}$ may be adjustable to maintain a maximum modulation index M in part load operation of the frequency converter.

Figure 3:
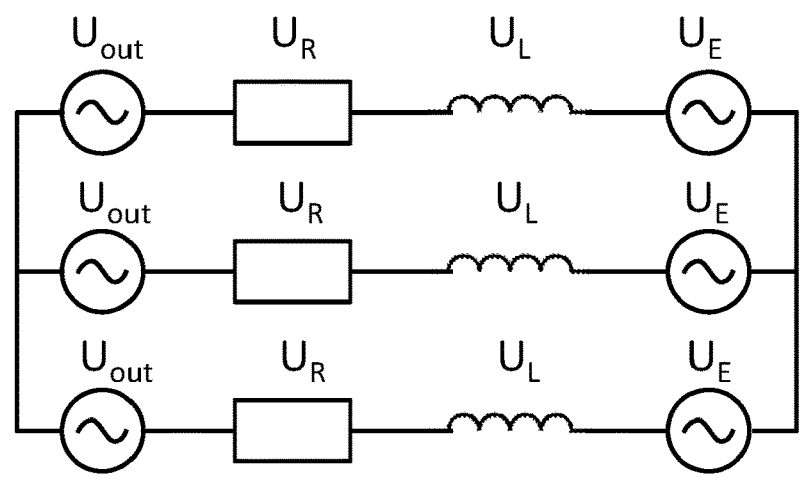
FIG. 3 is a circuit diagram of a three phase equivalent circuit of a control unit according to an example of a pump assembly disclosed herein.
Figure 4:
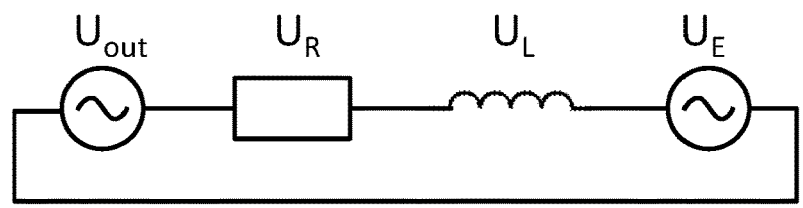
FIG. 4 is a circuit diagram a single phase equivalent circuit of a control unit according to an example of a pump assembly disclosed herein.

The three phase equivalent circuit of FIG. 3 simplifies the main components for controlling the motor. The three phases are identical and only phase-shifted by 120° with respect to each other. For each phase, the output voltage $U_{out}$ results from a resistive component $U_R$, an inductive component $U_L$ and a counter-electromotive force $U_E$ (abbreviated counter EMF or back EMF). The back EMF $U_E$ is an induced voltage caused on the stator windings by the motion of the permanent magnet rotor, and is thus dependent on the magnetic flux $\psi$ and the motor speed $\omega$ by $U_E = \psi \cdot \omega$. As further simplified in FIG. 4 as a single phase equivalent circuit, the main components may only be considered for one phase.

Figure 5:
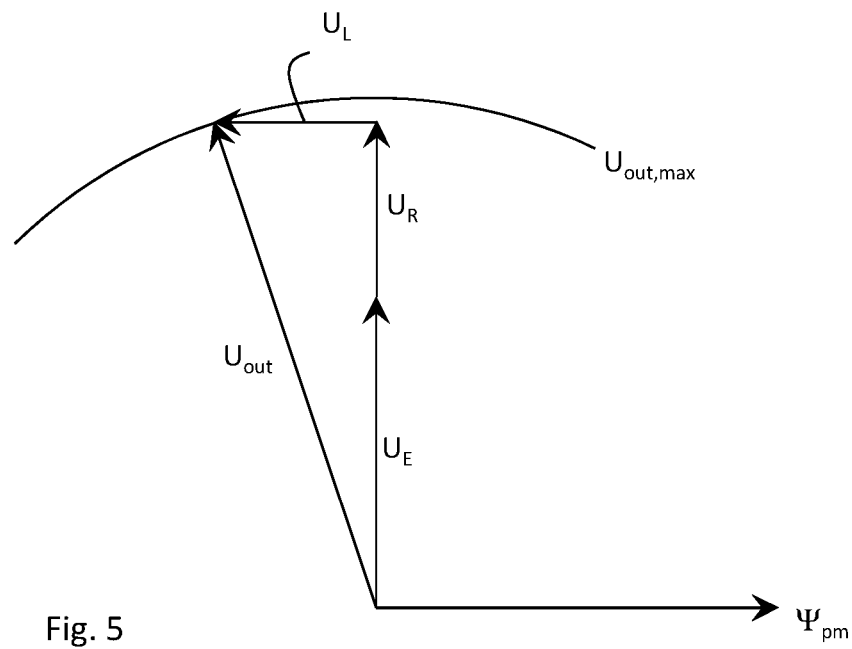
FIG. 5 is a vector diagram for operating a control unit according to an example of a pump assembly disclosed herein in a non-field-weakening mode.

The vector diagram in a rotating reference frame of FIG. 5 illustrates the phase relation between the main components in non-field weakening mode. The magnetic flux $\Psi_{pm}$ of the permanent magnet is 90° phase-shifted with respect to the phase current I. The output voltage $U_{out}$ results from the resistive voltage drop $U_R = R \cdot I$, the back EMF $U_E$ and the inductive voltage drop $U_L = \omega \cdot L \cdot I$, where an effective inductance L includes both a self-inductance and a phase coupling inductance. The resistive voltage drop $U_R$ and the back EMF $U_E$ are in phase, and the inductive voltage drop $U_L$ is 90° phase-shifted with respect to the resistive voltage drop $U_R$.

In the example shown in FIG. 5, the modulation index M is maximal so that the output voltage $U_{out}$ essentially equals a maximum output voltage $U_{out,max}$ illustrated by the circle. The undersized drive motor of the pump disclosed herein is designed to operate at a maximum modulation index $M_{max}$, a maximum output voltage $U_{out, max}$ and a speed $\omega$ in non-field weakening mode to provide a head H at a zero flow rate as shown in FIG. 5.

Figure 6:
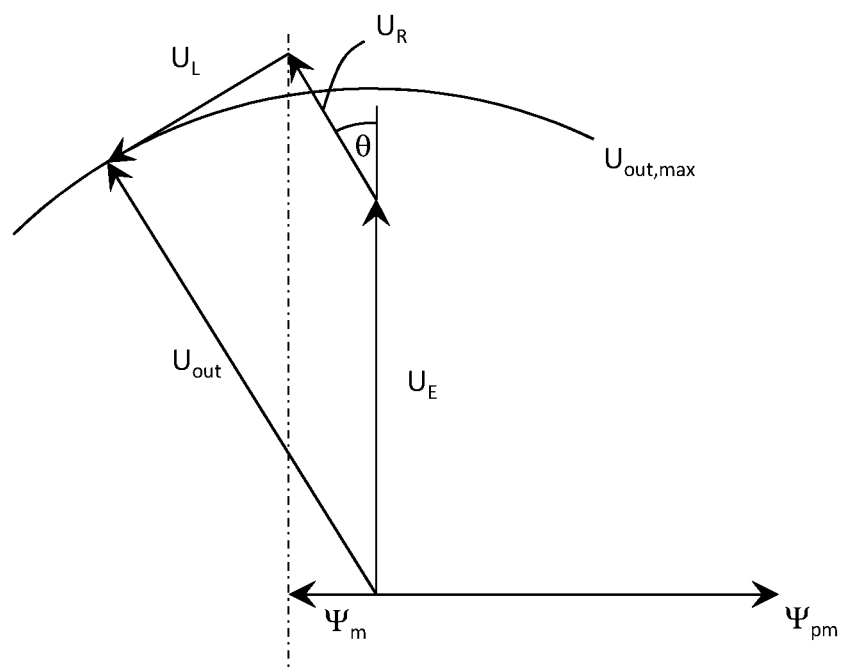
FIG. 6 is a vector diagram for operating a control unit according to an example of a pump assembly disclosed herein in a field-weakening mode.

In order to achieve a higher desired $H_0$ at a zero flow rate, the speed $\omega$ must be increased in field weakening mode as shown in FIG. 6. The switches 201 are controlled in such a way that the phase current I is phase shifted by an angle θ, whereby a magnetic flux $\Psi_m = I \cdot L \cdot \sin\theta$ is induced by the stator windings weakening the resulting magnetic flux in the motor $\Psi = \Psi_{pm} + \Psi_m$. The reduced magnetic flux in the motor $\Psi$ results in less torque and hydraulic output power of the pump, but can provide (at lower efficiency) the desired $H_0$ at zero flow rate. The reduced efficiency is the reason why conventional motor design for pumps would foresee motor parameters, such as the number of stator windings and/or the wire cross-section for achieving the desired $H_0$ at a zero flow rate through the non-field weakening mode as depicted in FIG. 5. However, the undersized drive motor of the pump disclosed herein may not predominantly be operated in such a full load operation of the frequency converter. Most of the time, the frequency converter is operated at part load in a non-field weakening mode for which the undersized armature is more efficient.

Thus, field-weakening mode means that the phase current partly reduces the total magnetic flux, because it is phase-shifted with respect to the rotor magnetic flux by more than 90°. In non-field-weakening mode, the phase current has a phase-shift of 90° or less with respect to the rotor magnetic flux such that no component of the phase current reduces the total magnetic flux. In order to measure such a phase shift, position sensors may be used. As an alternative or in addition to using position sensors measuring the phase shift angle θ, the output voltage $U_{out}$ may be measured to determine whether a motor is running in field-weakening mode or non-field weakening mode. Having determined the magnetic flux $\Psi$, the resistance R, the inductance L, the motor speed $\omega$ and the phase current I, an output voltage $U_{out,calc}$ may be calculated as $$U_{out,calc} = \sqrt{(U_E + U_R)^2 + U_L^2} = \sqrt{(\psi \cdot \omega + I \cdot R)^2 + (\omega \cdot L \cdot I)^2}$$

under the assumption of non-field-weakening mode, i.e. a 90° phase-shift between $U_L$ and $U_R$. If the measured output voltage $U_{out}$ is lower than the calculated output voltage $U_{out,calc}$, the motor is running in field-weakening mode. Otherwise, it is running in non-field-weakening mode.

Thus, a drive motor of a pump may be tested on whether it is undersized or not by operating the pump at the specified minimal input voltage to provide a head $H_0$ at zero flow according to the specification of the pump. The magnetic flux $\Psi$, the resistance R, the inductance L, the motor speed $\omega$ and the phase current I may be measured to calculate $U_{out,calc}$ under the assumption of non-field-weakening mode as outlined above. If the measured output voltage $U_{out}$ is lower than the calculated output voltage $U_{out,calc}$, the motor is running in field-weakening mode and is therefore undersized. Otherwise, it is running in non-field-weakening mode and is thus normally sized.

Figure 7:
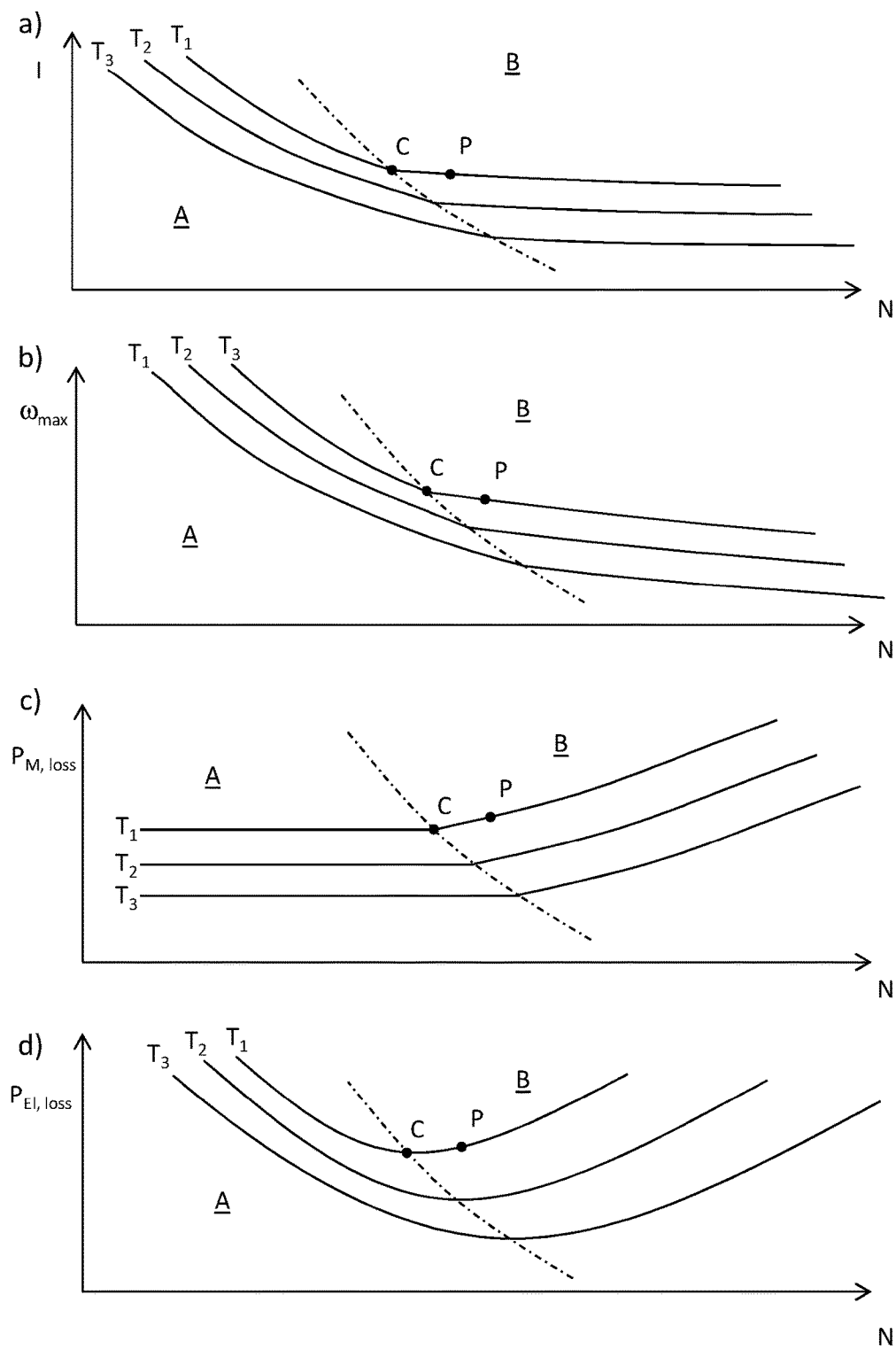
FIG. 7 is a graph view showing a design phase current, a design motor speed, a design motor power loss and a design electronics power loss for three different fixed design torques over the number of stator windings.

FIG. 7 shows different operational parameters for three fixed torques $T_1$, $T_2$ and $T_3$, where $T_1 > T_2 > T_3$, as a function of the number of stator windings N as design parameter. In a), the phase current I decreases in the non-field weakening region A with the number of stator windings N. Conventional motor design would aim to reduce the phase current for a given torque $T_1$ by the maximum number of windings up to the borderline between the non-field weakening region A and the field weakening region B (see point C). In contrast to that, the undersized drive motor disclosed herein has at least 10% more windings than that and has an operational point P in the field weakening region B for achieving a head $H_0$ at a zero flow rate. In b), the maximum speed $\omega_{max}$ is similarly limited by the number of windings N. The undersized drive motor with more windings at point P has a reduced maximum speed $\omega_{max}$ compared to a conventional reference motor at point C. The power loss in the motor as shown in c) is constant in the non-field weakening region A and rises with the number of windings N in the non-field weakening region B. Thus, conventional motor design would not exceed the number of stator windings into the field weakening region B, because it results in power loss in the motor. The undersized drive motor at point P has thus higher motor power loss for full load operation. The electronic power loss is shown in d) with a minimum at the borderline between the non-field weakening region A and the field weakening region B (see point C). A deviation like the undersized drive motor at point P results in more electronic power loss.

Figure 8:
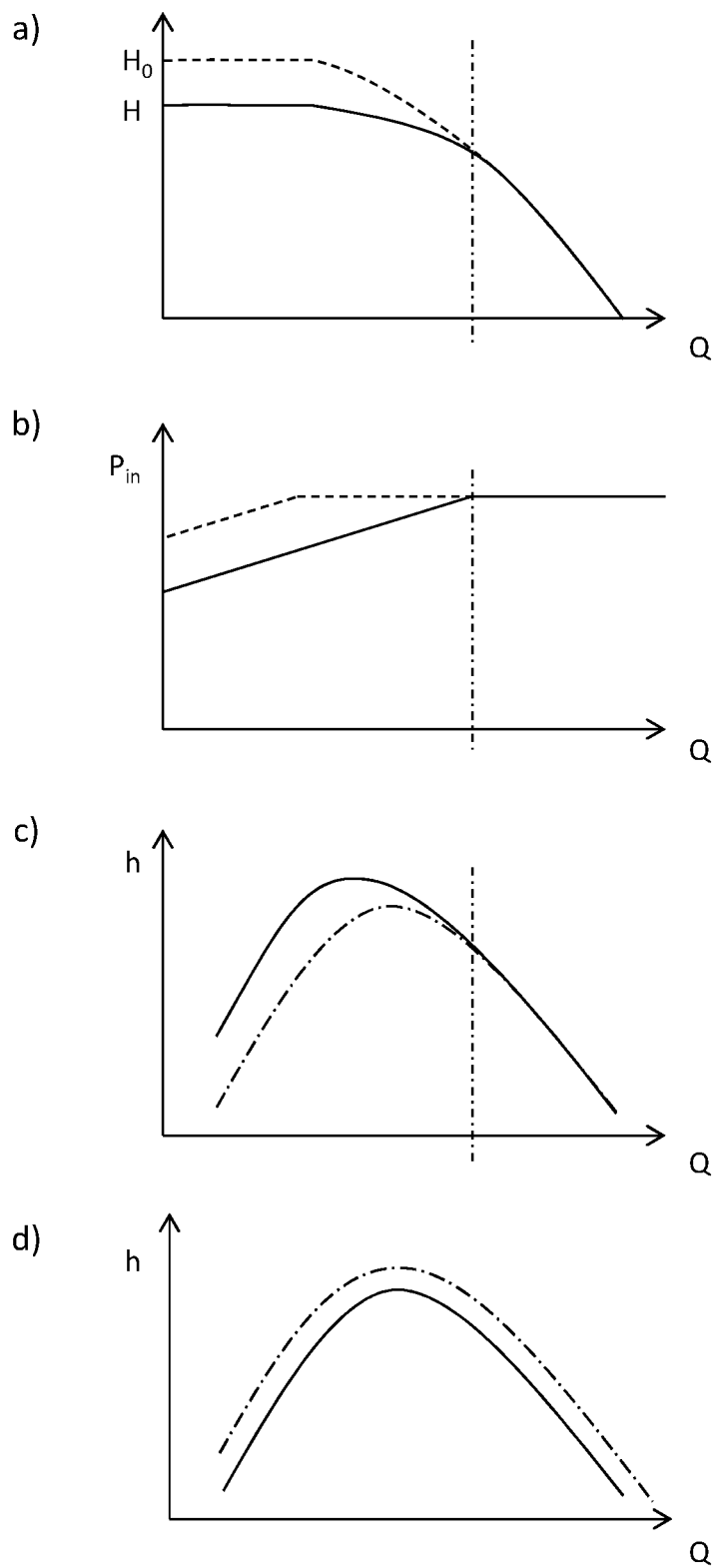
FIG. 8 is a graph view showing a HQ-diagram, a PQ-diagram and two eQ-diagrams for full and part load operation, respectively, of a frequency converter according to an example of a pump assembly disclosed herein.

FIG. 8 a) shows in a head-flow diagram, i.e. HQ-diagram, as a solid line the characteristic curve of the pump with the undersized drive motor operating in non-field weakening mode, in which only a head H is achievable at a zero flow rate. The dashed curve displays the undersized pump's characteristic curve in field weakening mode, in which it achieves the desired $H_0$. Conventional pump design would choose design parameters to follow the dashed curve in non-field weakening mode. The reason for this becomes clear in FIG. 8 b) showing a higher power consumption $P_{in}$ for running in field weakening mode (dashed line) compared to the non-field weakening mode at full load of the frequency converter. FIG. 8 c) shows the efficiency $h=P_{in}/P_{out}$ at full load of the frequency converter in comparison between a conventional motor design (solid line) and the undersized design (dashed-dotted line). At full load, the conventional motor design is more efficient for lower flow rates and essentially the same for higher flow rates. However, as shown in FIG. 8 d), at part load of the frequency converter in non-field weakening mode only, the efficiency $h=P_{in}/P_{out}$ is lower for a conventional motor design (solid line) compared to the undersized design (dashed-dotted line) over a wide range of flow rates. So, the undersized drive motor has its advantage in particular when the frequency converter is operated at part load.

Figure 9:
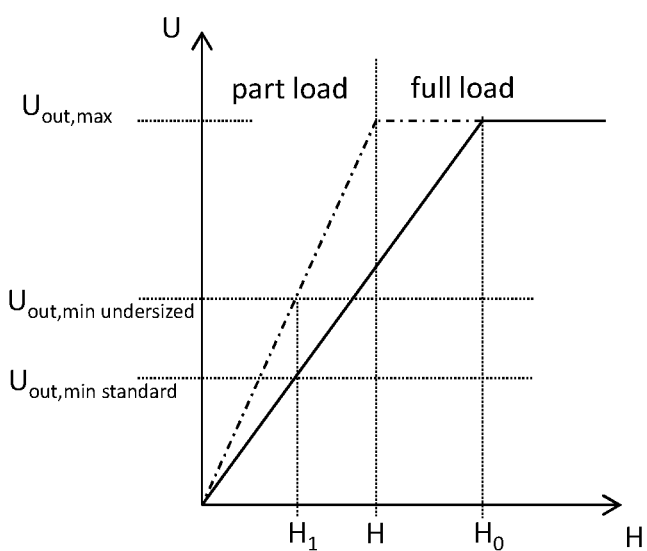
FIG. 9 is a UH-diagram according to an example of a pump assembly disclosed herein compared to a standard motor design.

FIG. 9 shows the output voltage $U_{out}$ as a function of the head H for a standard motor design (solid line) and an undersized motor design (dashed-dotted line). In part load of the frequency converter for providing a head in a range between $H_1$ to $H_0$, where $H_1<H_0$, the standard motor control would vary the output voltage $U_{out}$ adapted to the needed motor speed. In order to maintain a high modulation index M, the input voltage $U_{in}$ to the frequency converter may be adjusted accordingly. The standard motor design would achieve the desired head $H_0$ at a maximum output voltage $U_{out,max}$ with the maximum modulation index $M_{max}$.

In part load for providing a head in a range between $H_1$ to H, where $H_1<H$, the undersized drive motor operates at a higher output voltage compared to the standard motor design for providing the same head. The minimal output voltage $U_{out,min\ undersized}$ for providing a head $H_1$ is higher than the minimal output voltage $U_{out,min\ standard}$ for a standard motor. Therefore, the undersized motor can be operated more efficiently with a lower phase current I to provide the same power $P_{out}$ in part load of the frequency converter. However, when the maximum output voltage $U_{out,max}$ is reached at a head H, the undersized motor must go into the less efficient field weakening mode for providing a higher head than H.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

What is claimed is:

1. A pump assembly comprising:
   a pump unit configured to provide a desired pressure head at zero flow rate;
   a brushless speed-controlled permanent-magnet AC drive motor for driving the pump unit; and
   a control unit for controlling the drive motor, the control unit comprising a frequency converter configured to receive an input voltage, wherein:
   the drive motor is operable in a field-weakening mode and non-field-weakening mode; and
   the drive motor is undersized for driving the pump unit at a design input voltage to provide a lower pressure head than the desired pressure head at zero flow rate in the non-field-weakening mode and for driving the pump unit to provide the desired pressure head at zero flow rate in the field-weakening mode.

2. The pump assembly according to claim 1, wherein the frequency converter is configured to provide a pulse width modulated AC output voltage at a modulation index to the drive motor.

3. The pump assembly according to claim 2, wherein the AC output voltage is limited by the input voltage at a maximum modulation index $M_{max} \approx 1$.

4. The pump assembly according to claim 1, wherein the design input voltage is a lowest possible input voltage for providing the lower pressure head at zero flow rate in the non-field-weakening mode.

5. The pump assembly according to claim 1, wherein:
the control unit further comprises a voltage converter for providing the input voltage to the frequency converter; and
the input voltage is adjustable within a voltage range between a minimum input voltage and a maximum input voltage.

6. The pump assembly according to claim 1, wherein the drive motor comprises a stator with at least 10% more windings of a wire having at least a 10% smaller cross-section compared to a reference drive motor sized for driving the pump unit to provide the desired pressure head at zero flow rate in the non-field-weakening mode.

7. The pump assembly according to claim 1, wherein the drive motor may demand an at least 10% higher output voltage from the frequency converter when operated in non-field-weakening mode compared to a reference drive motor sized for driving the pump unit to provide the desired pressure head at zero flow rate in the non-field-weakening mode.

8. The pump assembly according to claim 1, wherein the frequency converter is configured to receive an input voltage below 60 V.

9. The pump assembly according to claim 5, wherein:
the voltage converter is configured to provide the input voltage within a voltage range between the minimum input voltage and a reference voltage in the field-weakening mode;
the voltage converter is configured to provide the input voltage within a voltage range between the reference voltage and the maximum input voltage in the non-field-weakening mode; and
the minimum input voltage is less than the reference voltage which is less than the maximum input voltage.

10. The pump assembly according to claim 9, wherein the frequency converter is configured to operate at a maximum modulation index $M_{max} \approx 1$ when the input voltage approximately equals the reference voltage.

11. The pump assembly according to claim 5, wherein the design input voltage is the maximum input voltage for providing the pressure head at zero flow rate in the non-field-weakening mode.

12. The pump assembly according to claim 5, wherein:
the control unit is configured to determine an actual power consumption of at least one of the drive motor and the frequency converter during operation of the pump unit; and
the control unit is configured to tune the input voltage so that the determined actual power consumption is minimized.

13. The pump assembly according to claim 1, wherein the pump unit comprises a wet rotor circulation pump for a heating or cooling system.

14. A method for controlling a brushless speed-controlled permanent-magnet AC drive motor via a frequency converter for driving a pump unit for providing a desired pressure head at zero flow rate, the method comprising:
driving the pump unit at a design input voltage to provide a lower pressure head than the desired pressure head at zero flow rate in a non-field-weakening mode;
driving the pump unit to provide the desired pressure head at zero flow rate in a field-weakening mode.

15. The method according to claim 14, further comprising providing a pulse width modulated AC output voltage at a modulation index to the drive motor.

16. The method according to claim 14, wherein the design input voltage is the lowest possible input voltage for providing the pressure head at zero flow rate in the non-field-weakening mode.

17. The method according to claim 14, wherein driving the pump unit at a design input voltage to provide a lower pressure head than the desired pressure head at zero flow rate in a non-field-weakening mode comprises driving the pump unit with an at least 10% higher output voltage from the frequency converter to the drive motor compared to driving the pump unit with a reference drive motor sized for driving the pump unit to provide the desired pressure head at zero flow rate in the non-field-weakening mode.

18. The method according to claim 14, further comprising providing an input voltage to the frequency converter, wherein the input voltage is adjustable within a voltage range between a minimum input voltage and a maximum input voltage.

19. The method according to claim 18, wherein the design input voltage is the maximum input voltage for providing the pressure head at zero flow rate in the non-field-weakening mode.

20. The method according to claim 18, wherein providing an input voltage comprises providing a DC input voltage below 60 V.

21. The method according to claim 18, wherein:
providing the input voltage comprises providing the input voltage within a voltage range between the minimum input voltage and a reference voltage in the field-weakening mode;
providing the input voltage includes providing the input voltage within a voltage range between the reference voltage and the maximum input voltage in the non-field-weakening mode; and
the minimum input voltage is less than the reference voltage which is less than the maximum input voltage.

22. The method according to claim 21, further comprising operating the frequency converter at a maximum modulation index $M_{max} \approx 1$ when the input voltage approximately equals the reference voltage.

23. The method according to claim 14, further comprising determining an actual power consumption of at least one of the drive motor and the frequency converter during operation of the pump unit, and wherein the control unit is configured to tune the input voltage so that the determined actual power consumption is minimized.

* * * * *